United States Patent
Yamasaki

(10) Patent No.: US 9,154,656 B2
(45) Date of Patent: Oct. 6, 2015

(54) IMAGE READING DEVICE

(71) Applicant: Yasuo Yamasaki, Nagoya (JP)

(72) Inventor: Yasuo Yamasaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/014,444

(22) Filed: Aug. 30, 2013

(65) Prior Publication Data

US 2014/0063572 A1 Mar. 6, 2014

(30) Foreign Application Priority Data

Aug. 30, 2012 (JP) ................................. 2012-190059

(51) Int. Cl.
| | |
|---|---|
| H04N 1/04 | (2006.01) |
| H04N 1/00 | (2006.01) |
| H04N 1/12 | (2006.01) |
| H04N 1/10 | (2006.01) |
| H04N 1/193 | (2006.01) |
| H04N 1/024 | (2006.01) |

(52) U.S. Cl.
CPC ......... *H04N 1/00559* (2013.01); *H04N 1/0249* (2013.01); *H04N 1/0443* (2013.01); *H04N 1/1013* (2013.01); *H04N 1/1043* (2013.01); *H04N 1/12* (2013.01); *H04N 1/123* (2013.01); *H04N 1/193* (2013.01)
USPC ............ 358/497; 358/474; 358/471; 358/483

(58) Field of Classification Search
CPC . H04N 1/00559; H04N 1/123; H04N 1/1043; H04N 1/12; H04N 1/0443; H04N 1/1013; H04N 1/193; H04N 1/0249
USPC .................................. 358/497, 474, 471, 483
See application file for complete search history.

(56) References Cited

U.S. PATENT DOCUMENTS

| | | | |
|---|---|---|---|
| 6,937,368 B2 * | 8/2005 | Liu | ................ 358/474 |
| 8,081,356 B2 | 12/2011 | Yamauchi | |
| 8,289,587 B2 | 10/2012 | Yamauchi | |
| 2006/0044632 A1 * | 3/2006 | Aoyama et al. | ............... 358/497 |
| 2007/0236756 A1 | 10/2007 | Yamaguchi | |

(Continued)

FOREIGN PATENT DOCUMENTS

| | | |
|---|---|---|
| JP | 07-168286 A | 7/1995 |
| JP | 11-266347 A | 9/1999 |

(Continued)

OTHER PUBLICATIONS

Nov. 5, 2014—(EP) Extended Search Report—App 13181966.6.

(Continued)

*Primary Examiner* — Houshang Safaipour
(74) *Attorney, Agent, or Firm* — Banner & Witcoff, Ltd.

(57) ABSTRACT

An image reading device comprising: a document placing portion; a conveyor; a reading unit configured to read an image of the document, wherein the reading unit includes: an image sensor; a support which supports the image sensor, wherein in the case of reading the image of the document conveyed by the conveyor, the support is to be stopped at a predetermined reading position; a guide; and a driving unit, wherein the reading unit further includes: a release unit configured to release the contact with the guide by separating the support from the guide when the support is moved toward the predetermined reading position; and a contact portion configured to contact with the support separated from the guide by the release unit when the support is moved toward the predetermined reading position.

12 Claims, 13 Drawing Sheets

(56) References Cited

U.S. PATENT DOCUMENTS

2009/0190190 A1    7/2009    Yamauchi
2012/0069409 A1    3/2012    Yamauchi

FOREIGN PATENT DOCUMENTS

| | | |
|---|---|---|
| JP | 2005-037799 A | 2/2005 |
| JP | 2007-028487 A | 2/2007 |
| JP | 04-181983 B2 | 11/2008 |
| JP | 2009-205134 A | 9/2009 |

OTHER PUBLICATIONS

Feb. 18, 2015—(US) Non-Final Office Action—U.S. Appl. No. 14/531,561.

\* cited by examiner

IMAGE READING DEVICE

CROSS-REFERENCE TO RELATED APPLICATION

This application claims priority from Japanese Patent Application No. 2012-190059 filed on Aug. 30, 2012, the entire subject matter of which is incorporated herein by reference.

TECHNICAL FIELD

This disclosure relates to an image reading device.

BACKGROUND

There is an image reading device called a flatbed type. In general, such an image reading device includes an image sensor having reading elements arranged in a main scanning direction and a carriage moving the image sensor in a sub-scanning direction. The carriage has a structure capable of moving along a guide shaft. As such a guide shaft, a round bar shaped metal shaft is used (e.g., see JP-A-H11-266347).

SUMMARY

Meanwhile, in the above-described flatbed type image reading device, one image reading device is additionally provided with an automatic document feeder (hereinafter referred to as an "ADF"). In the case of using the ADF, the above-described carriage and image sensor are stopped at a predetermined reading position. If a document is conveyed by the ADF, the document passes through a point which faces the image sensor at the reading position during conveyance, and at that time, the image sensor reads an image of the document.

In such an image reading device, many parts may not be interposed between the image sensor and the guide shaft. Accordingly, even in consideration of tolerance of their part dimensions or tolerance of the positioning precision between the parts, the image sensor and the guide shaft are in a state where their positions can be determined with relatively good precision, and the reading quality of the image is stabilized in the reading using the flatbed.

However, between the image sensor and the ADF, the parts interposed between the image sensor and the guide shaft are increased and many parts are additionally interposed between the guide shaft and the ADF. Accordingly, in consideration of the tolerance of their part dimensions or the tolerance of the positioning precision between the parts with respect to all the parts, it is correspondingly difficult to position the image sensor and the ADF with good precision.

If the positioning precision of the image sensor and the ADF is low, the arrangement direction of the reading elements of the image sensor (main scanning direction) and the conveyance direction of the document by the ADF (sub-scanning direction) may be slightly inclined and may not be at right angles. Since the degrees of inclination are different from each device, the inclination becomes the cause where unevenness occurs in the reading quality of the image using the ADF.

Accordingly, this disclosure provides at least an image reading device, which is configured to determine relative positional relations between an image sensor and an ADF with better precision than that in the related art.

Hereinafter, the configuration adopted in this disclosure will be described. An image reading device of this disclosure includes: a document placing portion on which a document is placed; a conveyor configured to convey a document along a predetermined conveyance path; and a reading unit configured to read an image of the document. The reading unit includes: an image sensor having a plurality of reading elements arranged in a main scanning direction; a support which supports the image sensor and is movable together with the image sensor in a sub-scanning direction that is orthogonal to the main scanning direction; a guide, which guides the support in the sub-scanning direction through coming in contact with the support when the support is moved in the sub-scanning direction; and a driving unit configured to move the support in the sub-scanning direction. In the case of reading the image of the document placed on the document placing portion, the support is moved in the sub-scanning direction within a predetermined reading range, and in the case of reading the image of the document conveyed by the conveyor, the support is to be stopped at a predetermined reading position. In the case of moving in the sub-scanning direction within the predetermined reading range, the support is moved while keeping in contact with the guide. The reading unit further includes: a release unit configured to release the contact with the guide by separating the support and the guide when the support is moved toward the predetermined reading position; and a contact portion configured to contact with the support separated from the guide by the release unit when the support is moved toward the predetermined reading position.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
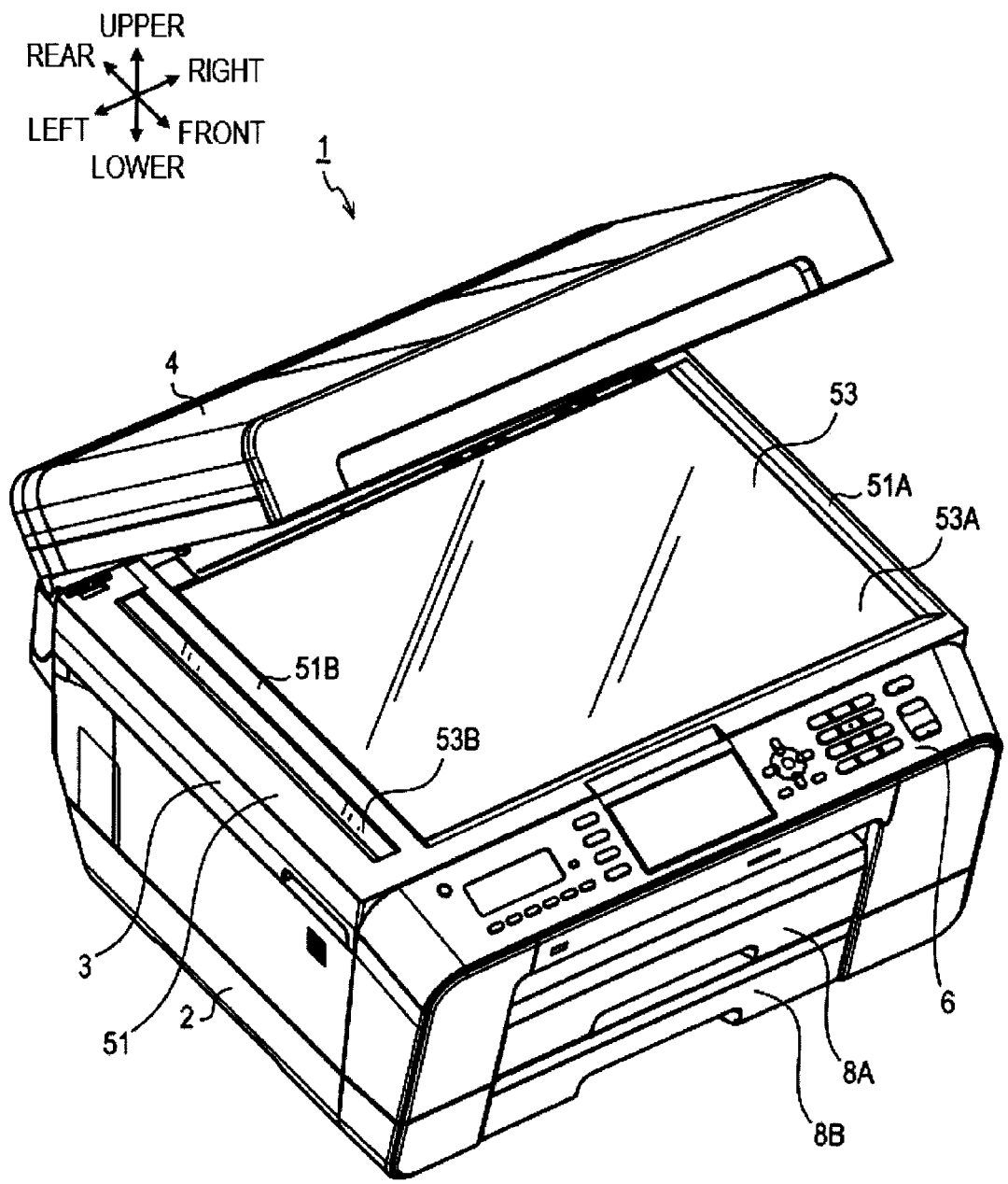
FIG. 1 is a perspective view illustrating an external appearance of the whole multifunction peripheral.

Hereinafter, embodiments of this disclosure will be described. In this embodiment, an exemplified image reading device is configured as a multifunction peripheral having other functions (e.g., print function, copy function, facsimile transmission/reception function, and the like) in addition to the function (scan function) as the image reading device. In the following description, for simple explanation of relative positional relations between respective portions of the multifunction peripheral, respective directions, that is, upper, lower, left, right, front, and rear directions, as described in the drawings will be used.

[Structure of a Multifunction Peripheral]

As illustrated in FIG. 1, a multifunction peripheral 1 includes a main body unit 2, a scanner unit 3 mounted on an upper side of the main body unit 2, and an ADF unit 4 mounted on an upper side of the scanner unit 3. On an upper portion of the front side of the main body unit 2, an operation panel 6 that is operated by a user is provided. On a lower portion of the main body unit 2, a feeder cassettes 8A and 8B, in which recorded medium before printing is accommodated, are mounted.

Figure 2:
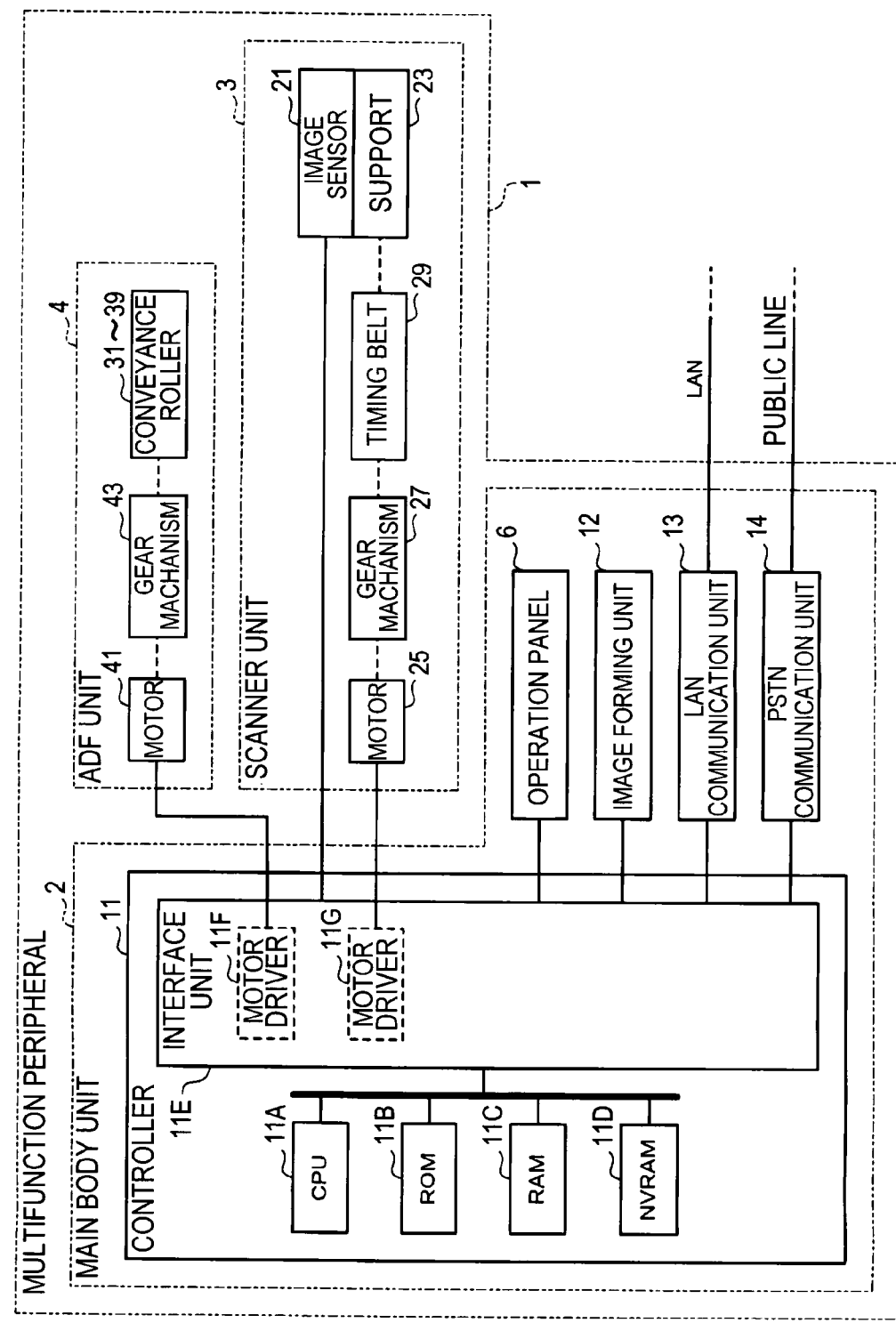
FIG. 2 is a block diagram illustrating the internal configuration of the multifunction peripheral.

In the main body unit 2, as illustrated in FIG. 2, a controller 11, an image forming unit 12, a LAN communication unit 13, and a PSTN communication unit 14 are provided in addition to the operation panel 6.

The controller 11 includes a known CPU 11A, a ROM 11B, a RAM 11C, an NVRAM 11D, and an interface unit 11E. The CPU 11A executes a predetermined process according to a control program stored in the ROM 11B or the RAM 11C, and thus the control of respective units of the multifunction peripheral 1 is executed.

The image forming unit 12 is provided with an electrographic or ink jet print mechanism. The LAN communication unit 13 includes a communication interface device supporting wireless LAN, and a communication interface device supporting wire LAN. The PSTN communication unit 14 includes various kinds of devices that are necessary to connect to the public switched telephone network (PSTN).

In the operation panel 6, input devices (e.g., a touch panel, various kinds of buttons, and switches), which is operated when a user provides various kinds of commands to the multifunction peripheral, and an output device (e.g., liquid crystal display device) for notifying a user of the operating state of the multifunction peripheral 1.

The scanner unit 3 includes a line type image sensor 21 having a plurality of reading elements, and a support 23 supporting the image sensor 21. Further, the scanner unit 3 includes a motor 25, a gear mechanism 27 that is driven by the motor 25, and a timing belt 29 that is driven by the gear mechanism 27, and the above-described support 23 is connected to the timing belt 29. The motor 25 receives a driving signal from a motor driving unit 11F provided in an interface unit 11E of the controller 11 to operate. The power that is generated by the motor 25 is transmitted to the support 23 through the gear mechanism 27 and the timing belt 29, and as a result, the support 23 is moved in the left/right direction together with the image sensor 21.

The ADF unit 4 includes conveyance rollers 31 to 39 conveying the document along a predetermined conveyance path. Further, in the ADF unit 4, a motor 41 and a gear mechanism 43 that is driven by the motor 41 are provided. The motor 41 receives a driving signal from a motor driving unit 11G provided in the interface unit 11E of the controller 11 to operate. The power that is generated by the motor 41 is transmitted to the conveyance rollers 31 to 39 through the gear mechanism 43. On the other hand, some of the conveyance rollers 31 to 39 is driving rollers directly driven by the gear mechanism 43, and other rollers are driven rollers rotated to follow the driving rollers or the document.

[Attachment Structure of the ADF Unit for the Scanner Unit]

As illustrated in FIG. 1, on an upper portion of the scanner unit 3, a cover member 51 is provided, and a platen glass 53 is attached to the cover member 51. The cover member 51 includes a frame portion 51A surrounding four sides of the platen glass 53, and a partition portion 51B dividing an upper surface of the platen glass 53 into a first area 53A and a second area 53B. In this embodiment, one sheet of platen glass 53 is divided into the first area 53A and the second area 53B. However, the first area 53A and the second area 53B may be provided by different platen glasses 53.

Figure 3:
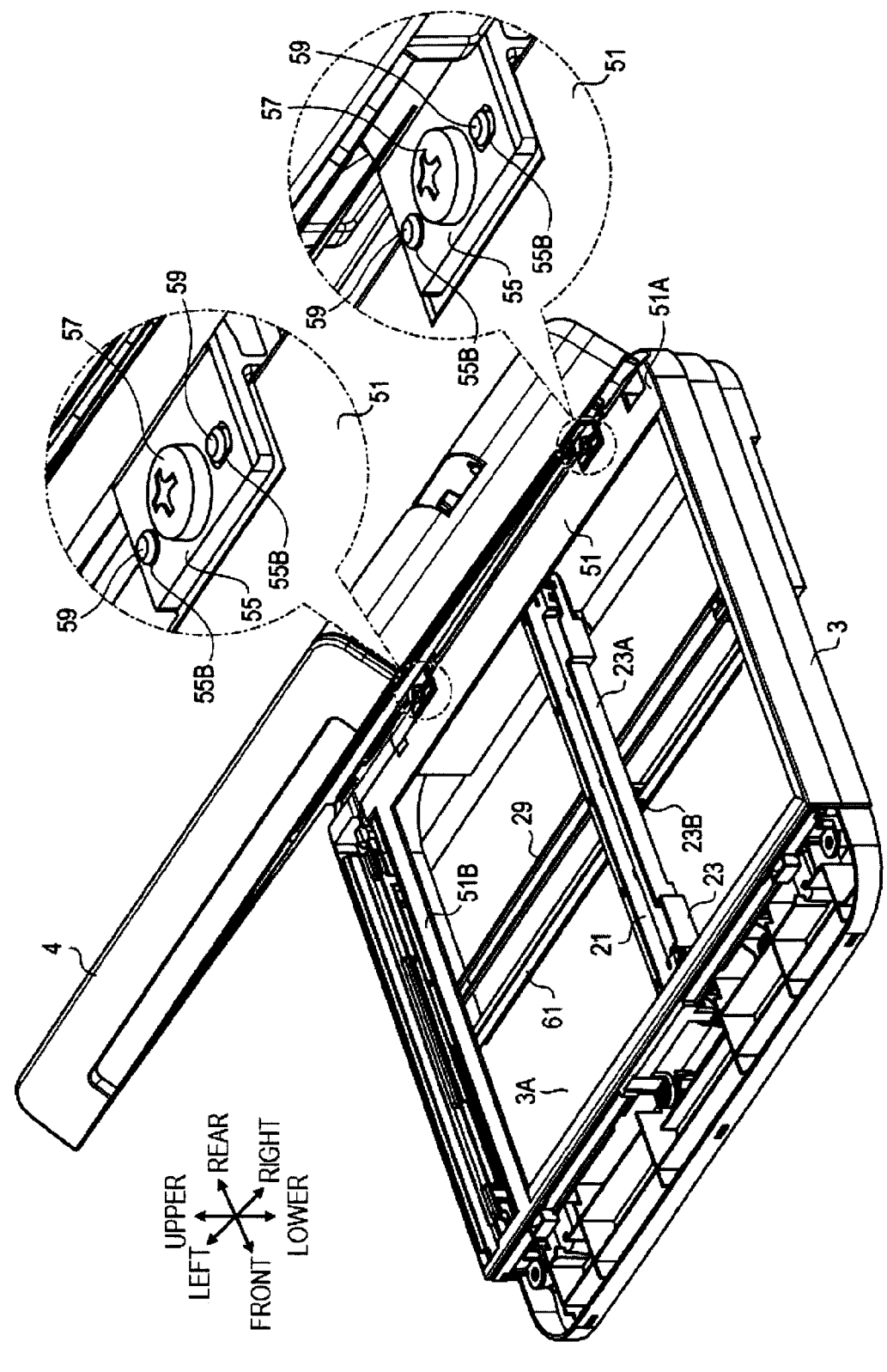
FIG. 3 is a perspective view illustrating an external appearance of a scanner unit and an ADF unit.
Figure 4:
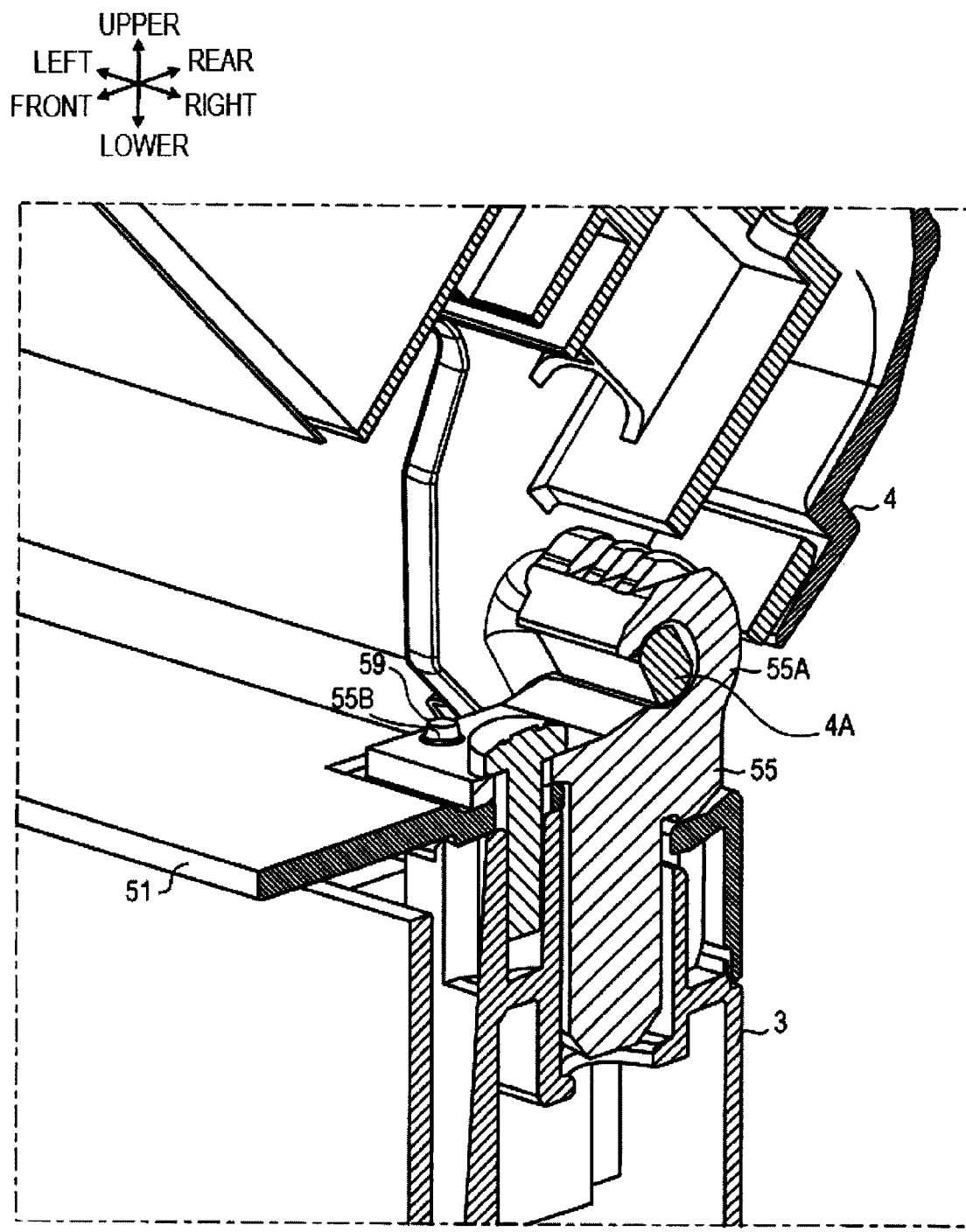
FIG. 4 is a perspective view illustrating a structure in the vicinity of a hinge portion.

As illustrated in FIG. 3, the ADF unit 4 is attached to the scanner unit 3 to be opened and closed by a pair of hinge portions 55 provided at positions that are spaced apart from each other in the left/right direction. On an upper end side of the hinge portion, as illustrated in FIG. 4, a bearing portion 55A is provided, and a rotating shaft 4A is provided on the side of the ADF unit 4. The rotating shaft 4A is rotatably supported by the bearing portion 55A.

If the ADF unit 4 is opened, as illustrated in FIG. 1, the upper surface of the platen glass 53 is exposed to an outside. On the other hand, if the ADF unit 4 is closed, the ADF unit 4 functions as a cover that covers the upper surface of the platen glass 53.

As illustrated in FIGS. 3 and 4, the hinge portion 55 is fixed to the scanner unit 3 by a screw 57. In the cover member 51 provided in the scanner unit 3, as illustrated in FIG. 3, two positioning projections 59 are provided to be corresponded to one hinge portion 55.

In the case of fixing the hinge portion 55 to the scanner unit 3, the positioning projection 59 is inserted into a positioning hole 55B formed on the side of the hinge portion 55, so that the hinge portion 55 is fixed to the scanner unit 3 in a state where it is positioned with relatively good precision with respect to the cover member 51. In this embodiment, the hinge portions 55 are provided at two points on the rear end side of the device main body. However, the number of hinge portions 55 is not limited to 2, and the attachment method is not limited to the above-described fixing method in so far as the hinge portion 55 is fixed to the scanner unit 3.

[Details of the Scanner Unit]

Figure 5:
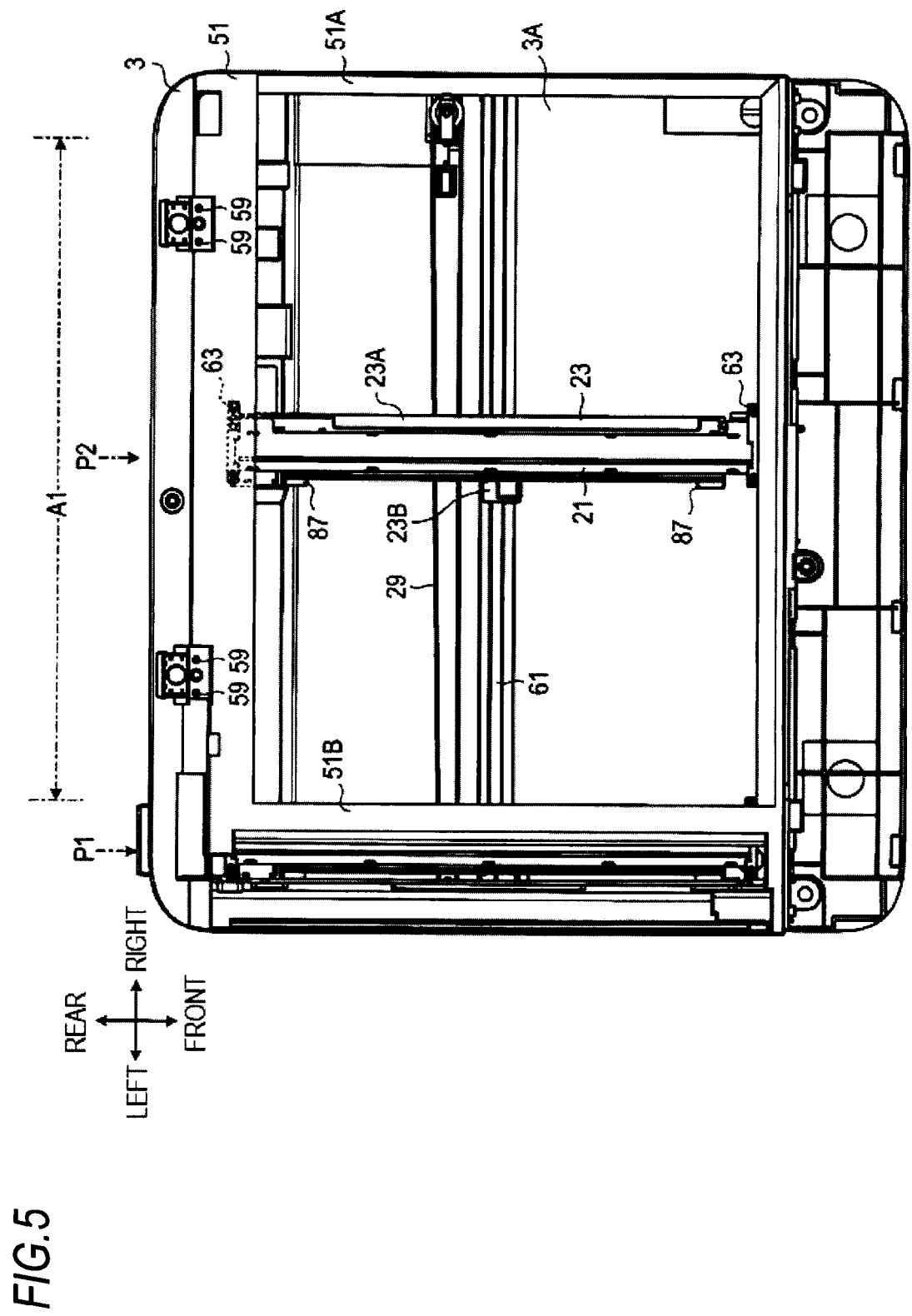
FIG. 5 is a plan view illustrating a scanner unit.

In the scanner unit 3, as illustrated in FIGS. 3 and 5, the above-described image sensor 21, the support 23, and the timing belt 29 are provided. On the other hand, FIG. 5 illustrates both a state, where the image sensor 21 has moved to a position P1 together with the support 23, and a state, where the image sensor 21 has moved to a position P2.

In this embodiment, the image sensor 21 is composed of a CIS (Contact Image Sensor). A plurality of reading elements provided in the image sensor 21 are arranged in the front/rear direction in the multifunction peripheral 1. Hereinafter, the front/rear direction that is the arrangement direction of the reading elements is called a main scanning direction.

As illustrated in FIG. 5, the support 23 has a carriage unit 23A, and a slider portion 23B that is attached to a bottom portion of the carriage unit 23A. The slider portion 23B is provided in the vicinity of the center in the main scanning direction of the carriage unit 23A, and it is made of a material having higher slidability than that of the carriage unit 23A. Specifically, in this embodiment, the carriage unit 23A is formed of ABS resin, and the slider portion 23B is formed of polyacetal resin (POM).

On an upper surface side of a base portion 3A that is provided in the scanner unit 3, a guide unit 61 that extends in the left/right direction is provided. The base portion 3A and the guide unit 61 are integrally formed of a resin material. If the timing belt is driven, the support 23 slides on the guide unit 61. Hereinafter, the left/right direction that is the moving direction of the image sensor 21 and the support is called a sub-scanning direction.

Figure 6:
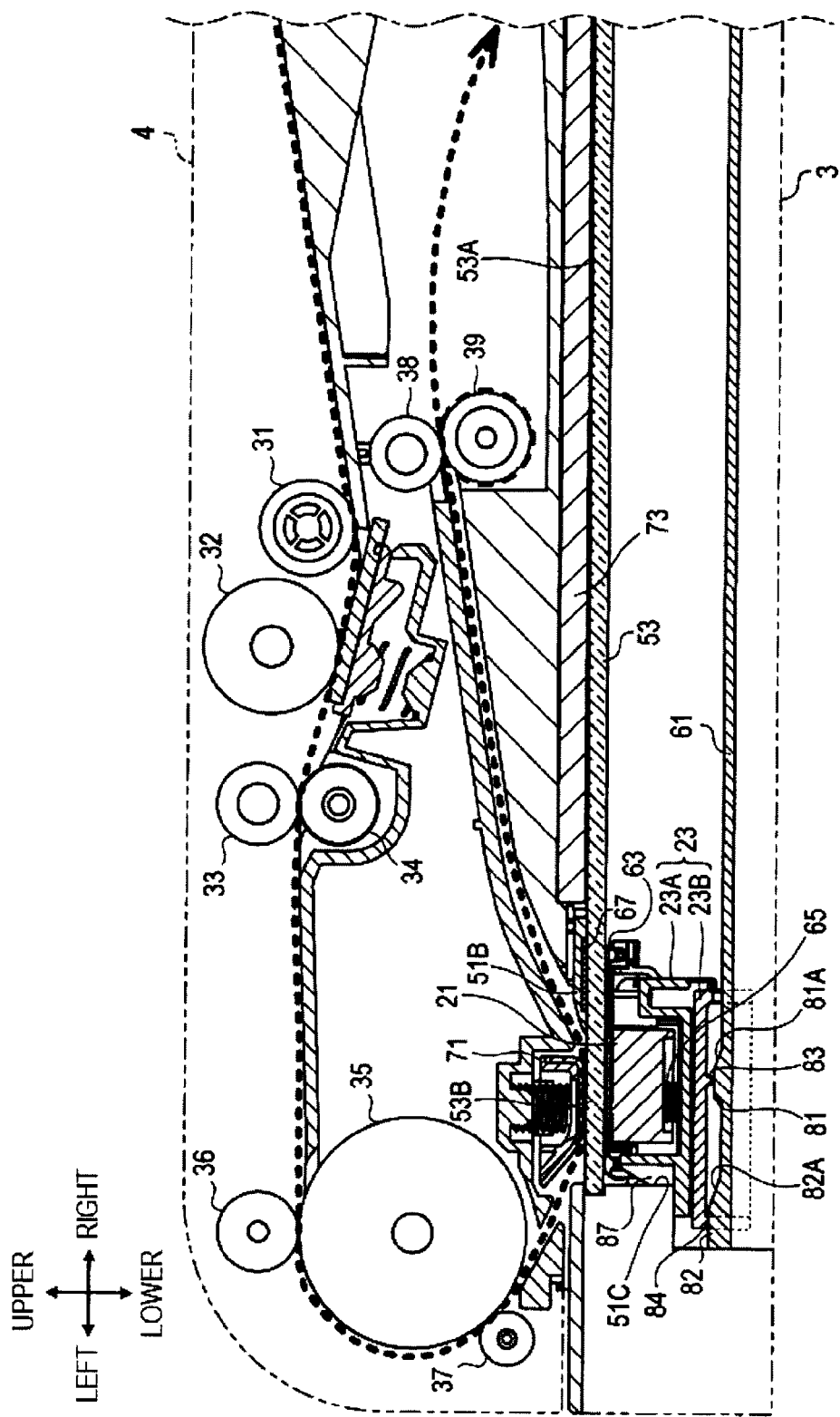
FIG. 6 is a longitudinal cross-sectional view illustrating a schematic structure of a scanner unit and an ADF unit.

In the vicinity of both ends in the front/rear direction of the image sensor 21, as illustrated in FIGS. 5 and 6, a spacer 63 that is interposed between the image sensor 21 and the platen glass 53 is attached. Further, a compression spring 65 is interposed between the support 23 and the image sensor 21.

The image sensor 21 and the spacer 63 are always in a compressed state toward the side of the platen glass 53. Accordingly, when the support 23 is moved, even if the support 23 slightly moves upward and downward, the spacer 63 keeps the contact state with the lower surface of the platen glass 53, and the image sensor 21 is maintained in parallel to the lower surface of the platen glass 53.

On the lower surface of the partition portion 51B that the cover member 51 has, a reference member 67 is incorporated. The reference member 67 is a member formed to have white portions and black portions for a predetermined pattern. When reading the image, in order to perform original point position correction and shading correction of the image sensor 21, the reference member 67 is read by the image sensor 21.

[Details of the ADF Unit]

In the ADF unit 4, as illustrated in FIG. 6, the plurality of conveyance rollers 31 to 39 as described above are provided. If the conveyance rollers 31 to 39 are driven, the document can be conveyed along a predetermined conveyance path (a path indicated by a dashed line).

In the case where the multifunction peripheral 1 is used as an ADF type image scanner, the image sensor 21 in the scanner unit 3 moves to the position P1 as shown in FIG. 5, and then it is stopped (hereinafter, the position P1 is also called a reading position P1). Further, the conveyance rollers 31 to 39 in the ADF unit 4 convey the document along the above-described conveyance path.

The conveyed document passes through a position where the document comes in contact with the second area 53B of the platen glass 53 in the left/right direction in the middle of the conveyance path. At this position, a document pressing portion 71 is provided. When the conveyed document passes through the position where the document pressing portion 71 is positioned, the document pressing portion 71 presses the document toward the second area 53B, and the document comes in close contact with the second area 53B of the platen glass 53. The image sensor 21 that is at the reading position P1 faces the second area 53B and the document pressing portion 71. In this state, the image sensor 21 can read the image of the document that passes through the reading position P1 by the reading elements arranged in the main scanning direction.

As illustrated in FIG. 6, on the lower surface of the ADF unit 4, an elastic member 73 is provided at a position that comes in contact with the first area 53A of the platen glass 53 when the ADF unit 4 is closed. The elastic member 73 is a laminated body including a foaming resin layer as its upper layer and a resin film layer as its lower layer.

In the case where the multifunction peripheral 1 is used as an image scanner, a document is placed on the first area 53A of the platen glass 53. If needed, the ADF unit 4 is closed. At this time, the elastic member 73 presses the document placed on the first area 53A from the upper side, and the document comes in close contact with the first area 53A of the platen glass 53. In this state, the image sensor 21 moves in the sub-scanning direction together with the support 23.

In this embodiment, during the forward movement to the left, the image sensor 21 is within a predetermined reading range A1, and the image of the document placed on the first area 53A of the platen glass 53 is read by the reading elements that are arranged in the main scanning direction. Thereafter, if the image reading is terminated, the image sensor 21 returns to the initial position through the return movement in the left direction.

[Positioning Mechanism of the Support at the Reading Position P1]

Figure 7:
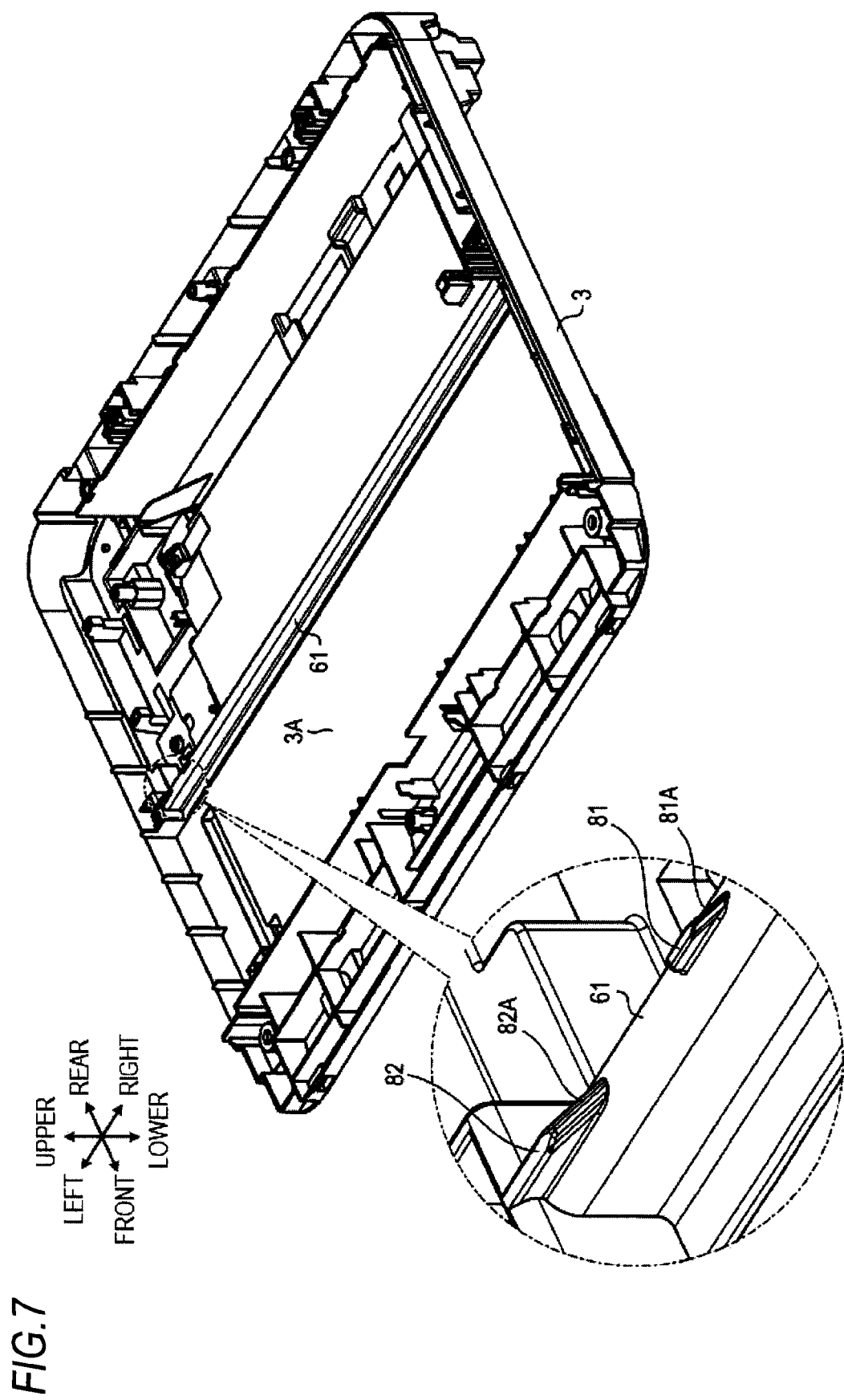
FIG. 7 is a perspective view illustrating a guide unit and a release unit.
Figure 8A:
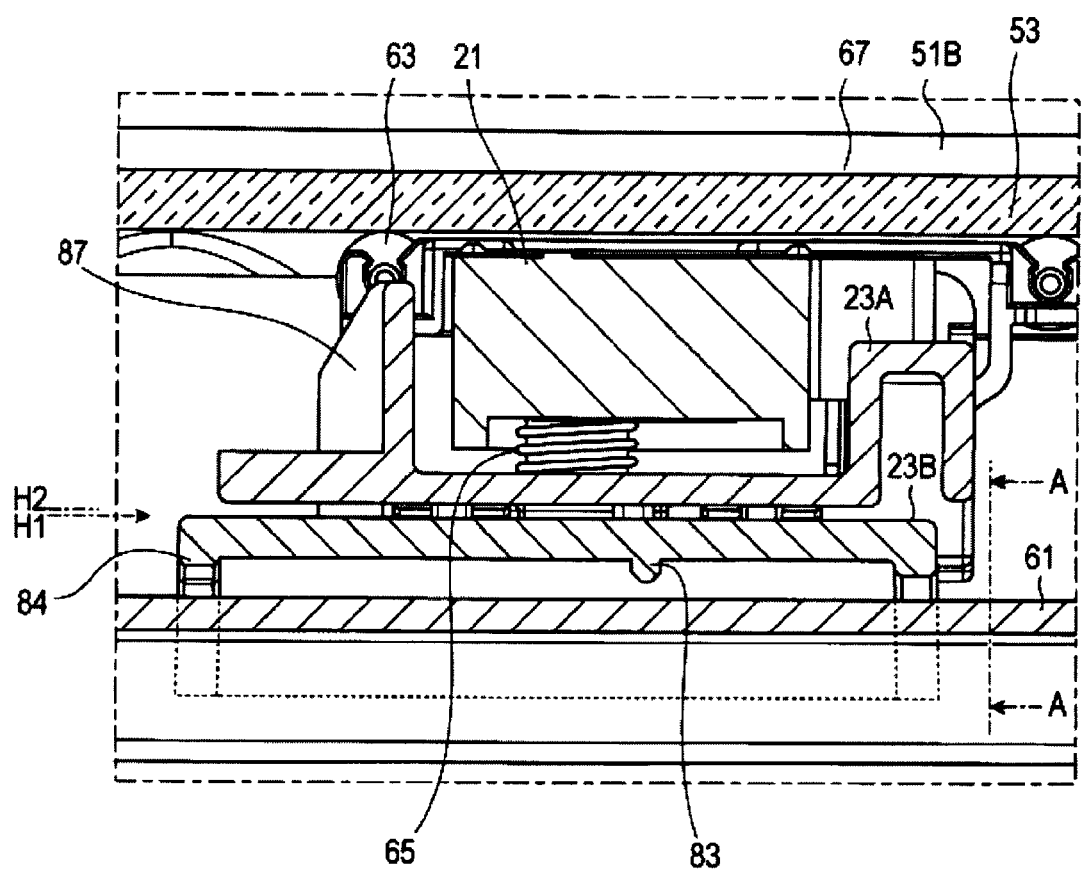
FIG. 8A is a longitudinal cross-sectional view illustrating a state where a slider portion and a guide unit are at a contact position as seen from the front side of the device.
Figure 8B:
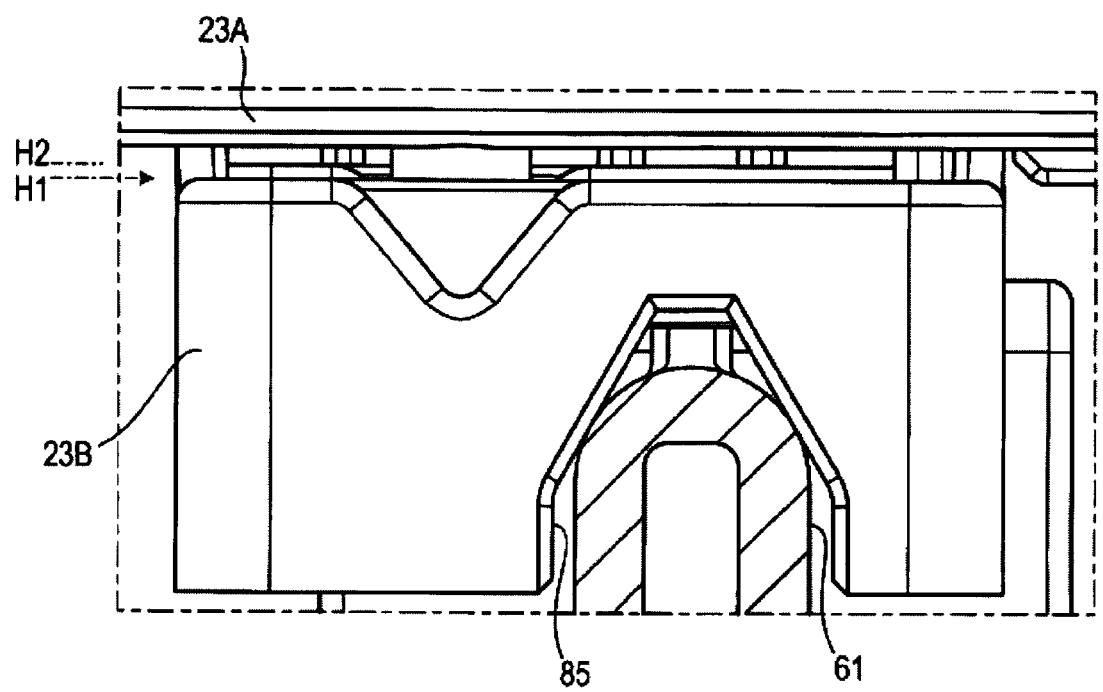
FIG. 8B is a longitudinal cross-sectional view illustrating a range taken along line A-A in FIG. 8A.

In the vicinity of the left end side of the guide unit 61, as illustrated in FIG. 7, a first projection portion 81 and a second projection portion 82 are formed. The first projection portion 81 and the second projection portion 82 are formed at positions that are separated from each other in the left/right direction, and are at the positions where they are seen to overlap each other as seen from the sub-scanning direction.

Further, both the first projection portion 81 and the second projection portion 82 project upward from the upper end of the guide unit 61, but the upper end of the second projection portion is at a higher position (upper side) than the upper end of the first projection portion 81. On the right end side of the first projection portion 81, an inclination portion 81A having an upward slop from the right side to the left side is formed. Even on the right end side of the second projection portion 82, an inclination portion 81A having an upward slop from the right side to the left side is formed. The upper ends of the first projection portion 81 and the second projection portion that continue on the upper end sides of the inclination portions 81A and 82A are flat planes.

On the other hand, on the slider portion 23B, as illustrated in FIGS. 8A, 8B, 9A, and 9B, a first convex portion 83 and a second convex portion that project downward are formed. The first convex portion 83 is formed at a position where the support 23 comes in contact with the first projection portion 81 when the support 23 is moved to the reading position P1, and the second convex portion 84 is formed at a position where the support 23 comes in contact with the second projection portion 82 when the support 23 is moved to the reading position P1 (see FIG. 8A).

When the slider portion 23B moves to the position where the slider portion 23B is separated from the first projection portion 81 and the second projection portion 82, the slider portion 23B moves in the left/right direction while keeping a state where the upper surface portion of the slider portion 23B is at a drop position H1. At this time, a groove portion that is formed on the lower side of the slider portion 23B comes in contact with the guide unit 61 at both sides of the guide unit 61 in the front/rear direction in the vicinity of the upper end of the guide unit 61. (See FIG. 8B).

In such a contact state, the slider portion 23B is unable to be displaced in the rotating direction along the surface perpendicular to the upper/lower direction (i.e. surface parallel to the front/rear direction or the left/right direction). Accordingly, the support 23 is positioned at a position where the length direction of the support 23 and the length direction of the guide unit 61 are orthogonal to each other on the basis of the guide unit 61.

Figure 9A:
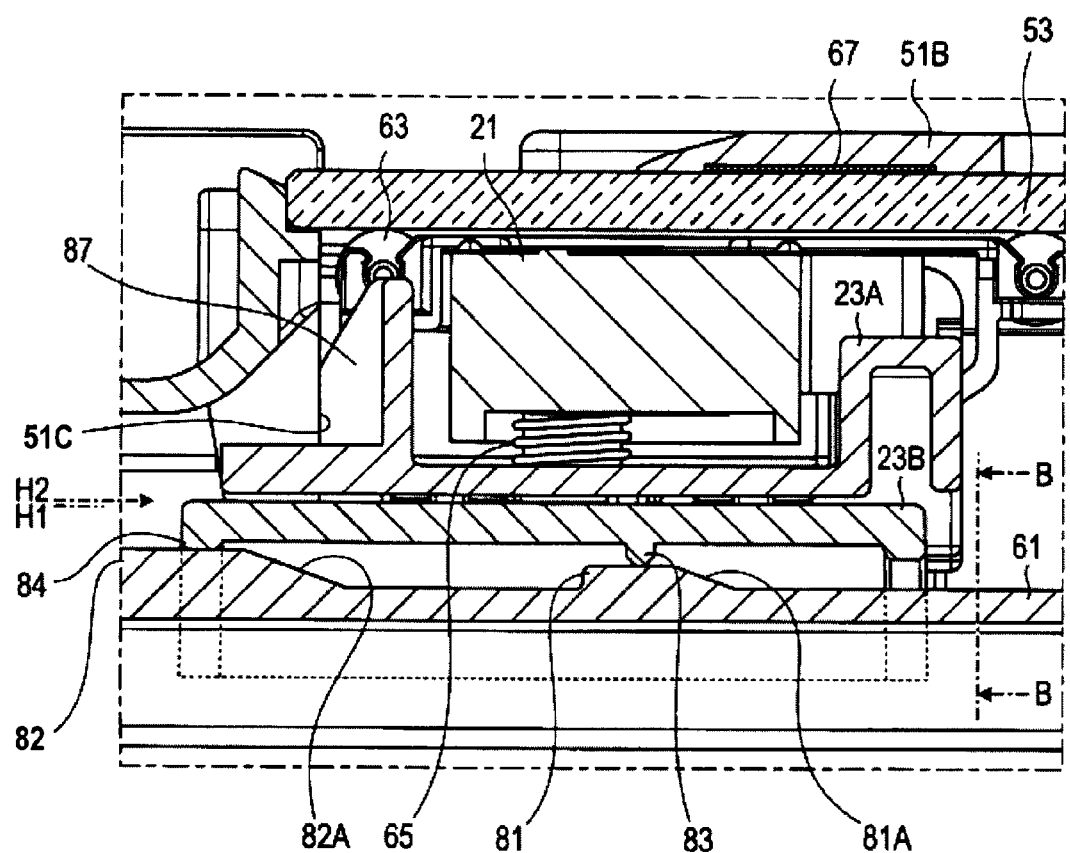
FIG. 9A is a longitudinal cross-sectional view illustrating a state where a slider portion and a guide unit are at separate positions as seen from the front side of the device.
Figure 9B:
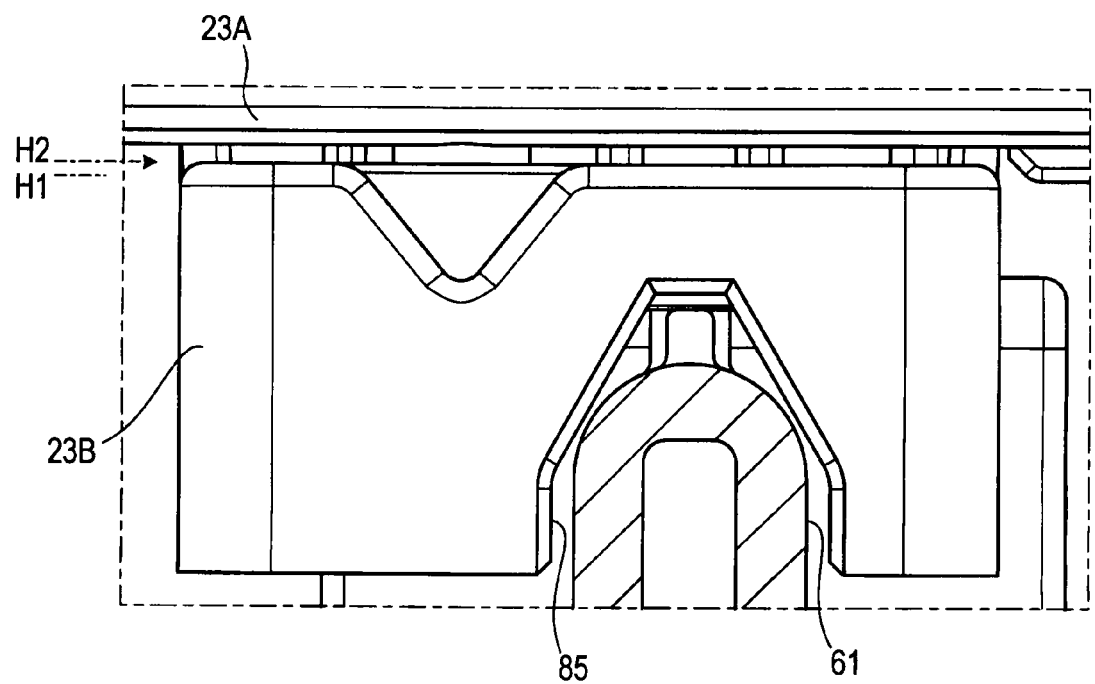
FIG. 9B is a longitudinal cross-sectional view illustrating a range taken along line B-B in FIG. 9A.

On the other hand, if the support 23 is moved in the left direction and is reached the reading position P1, as illustrated in FIGS. 9A and 9B, the slider portion 23B runs onto the first projection portion 81 and the second projection portion 82. At this time, since the inclination portions 81A and 82A are provided on the first projection portion 81 and the second projection portion 82, respectively, the slider portion 23B can be smoothly guided to the upper side of the first projection portion 81 and the second projection portion 82 as the support 23 move in the left direction.

Further, the upper ends of the first projection portion 81 and the second projection portion 82 have different positions (heights), and thus the positions (heights) of the upper ends of the first projection portion 81 and the second projection portion 82 are changed. Through this, when the support 23 reaches the reading position P1, the lower end of the second convex portion 84 passes in the left direction along the upper side of the first projection portion 81 and runs onto the second projection portion 82 without coming in contact with the upper end of the first projection portion 81.

If the slider portion 23B runs onto the first projection portion 81 and the second projection portion 82, the support 23 is moved slightly upward without changing the inclination for the left/right direction and the front/rear direction, and the upper surface portion of the slider portion 23B is displaced to a rise position H2. Further, since the upper ends of the first projection portion 81 and the second projection portion 82 are flat surface and come in surface contact with the first projection portion 83 and the second projection portion 84, it becomes possible to support the rising slider portion 23B in a stable state with respect to the guide unit 61.

Further, in this state, the groove portion 85 that is formed on the lower side of the slider portion 23B is separated from the upper end of the guide 61 (see FIG. 9B). In this state, the slider portion 23B is supported by the upper ends of the first projection portion 81 and the second projection portion 82 and the timing belt 29, and it is in a condition to be able to be displaced in the rotating direction along the surface perpendicular to the upper/lower direction (i.e. surface in parallel to the front/rear direction and the left/right direction). That is, the first projection portion 81 and the second projection portion 82 function as release units to release the contact with the guide unit 61 when the support 23 is moved toward the reading position P1.

Further, as illustrated in FIGS. 5 and 9A, a pair of contacted portions 87 are formed at positions separated from each other in the front/rear direction. When the support 23 is moved toward the reading position P1, the contact portion 51c that is integrally formed on the cover member 51 comes in contact with the contacted portion 87 (see FIG. 9A).

Figure 10A:
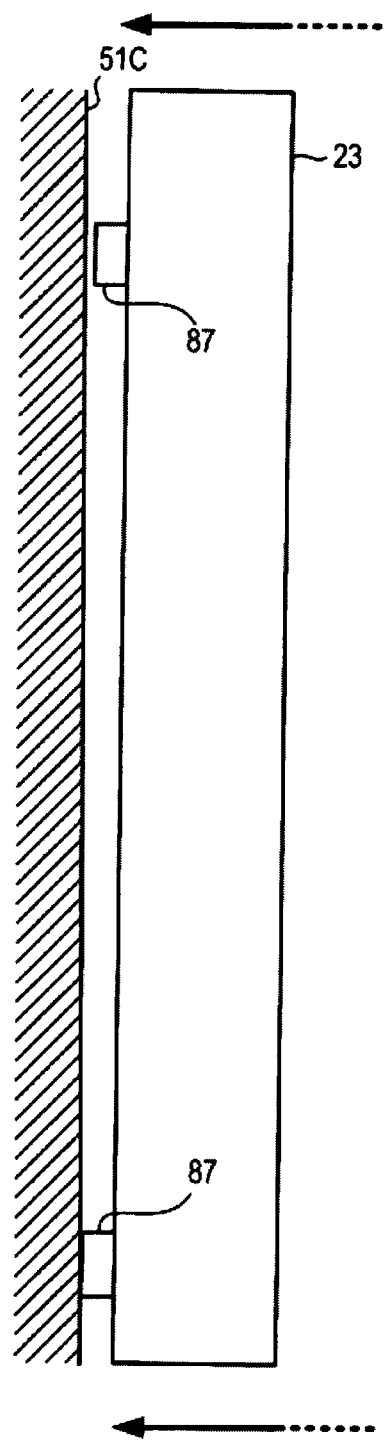
FIGS. 10A and 10B are explanatory views illustrating the state of positioning of a support and a contact portion.
Figure 10B:
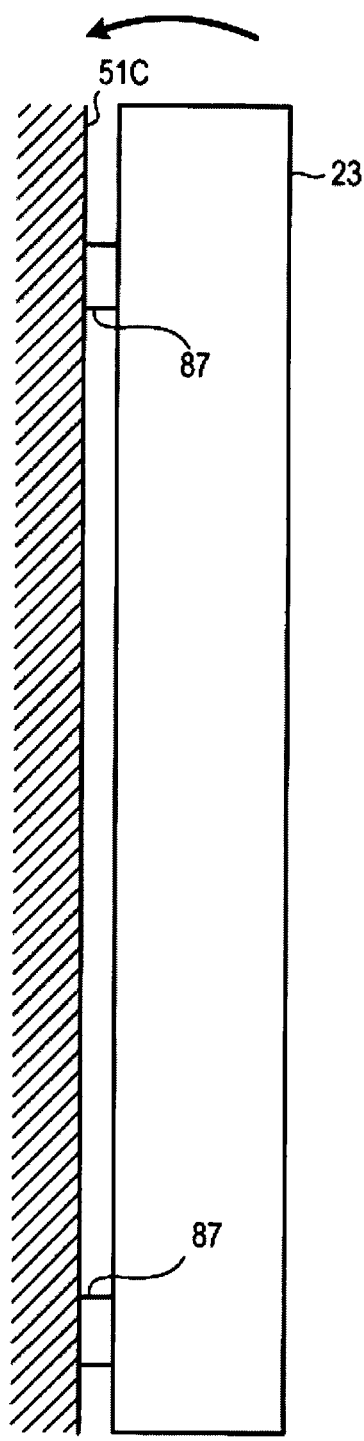

Accordingly, as illustrated in FIG. 10A, if the contact portion 51C comes in contact with one of the contacted portions 87, even though the support 23 is slightly inclined against the contact portion 51, the support 23 is rotated in the direction in which the other of the contacted portions 87 approaches the contact portion 51C as illustrated in FIG. 10B. As a result, the support 23 is positioned on the basis of the cover member 51.

The support 23 is positioned on the basis of the cover member 51 at the reading position P1, and it is positioned on the basis of the guide unit 61 when it moves in the reading range A1. As described above, the ADF unit 4 is supported by the hinge portion 55, and the cover member 51 of the hinge portion 55 is positioned with good precision. However, another component is interposed between the hinge portion 55 and the guide unit 61, and thus the hinge portion 55 and the guide unit 61 are not in direct positioning relations.

Accordingly, the tolerance of the relative position for the ADF unit 4 becomes smaller than that of the guide unit 61. Accordingly, if the support 23 is moved toward the reading position P1, the positioning on the basis of the guide member 61 is released, and it is changed to the positioning based on the cover member 51. Accordingly, the positioning accuracy between the support 23 and the ADF unit 4 can be further improved.

[Effects]

As described above, according to the above-described multifunction peripheral 1, in the case of reading the image of the document conveyed in the ADF unit 4, the support 23 comes in contact with the contact portion 51C, and thus is positioned at a portion where the tolerance of the relative position for the ADF unit 4 is smaller than that for the guide unit 61.

Accordingly, as compared with the case where the support 23 is positioned against the guide unit 61, the tolerance accumulated between the support 23 and the ADF unit 4 can be reduced, and thus the quality deterioration of the read image can be suppressed due to the tolerance accumulated between the support 23 and the ADF unit 4.

According to the above-described multifunction peripheral 1, since the release unit is constructed by the first projection portion 81 and the second projection portion 82 formed to project from the guide unit 61, the release unit has a simple structure, and thus can be easily prepared as compared with a case where the release unit having a complicated structure is prepared.

According to the above-described multifunction peripheral 1, when the support 23 is moved toward the reading position P1, the support 23 runs onto the first projection portion 81 and the second projection portion 82 at the same time, and then it is separated from the guide unit 61 while performing parallel movement. Accordingly, when the support 23 runs onto the projection portions, the inclination of the support 23 is changed, and thus the behavior of the support 23 becomes stabilized. Further, even after the support 23 runs onto the first projection portion 81 and the second projection portion 82, the support 23 can be supported on the first projection portion 81 and the second projection portion 82 in more stable state.

According to the above-described multifunction peripheral 1, since the first projection portion 81 and the second projection portion 82 are in positions where they are seen to overlap each other as seen from the sub-scanning direction, a region required for arrangement of the projection portions becomes compact as compared with a case where the plurality of projection portions are in the position to not overlap each other as seen from the sub-scanning direction. Further, According to the above-described multifunction peripheral 1, in the moving direction where the support 23 is moved toward the reading position P1, the projection height of the first projection portion 81 positioned in the more upstream side is set low, and the projection height of the second projection portion 82 positioned in the downstream side is set high. In other words, the highest portion of the first projection portion 81 positioned in the upstream side is lower than the highest portion of the second projection portion 82 positioned in the downstream side. Accordingly, although the first projection portion 81 and the second projection portion 82 are in positions where they are seen to overlap each other as seen from the sub-scanning direction, the second convex portion 84 can pass through the first projection portion 81 without running onto the first projection portion 81 in the upstream side when the support 23 is moved to the reading position P1. Accordingly, unlike a case where the projection height of the first projection portion 81 in the upstream side is higher than that of the second projection portion 82 in the downstream side or a case where the projection heights of the first projection portion 81 and the second projection portion 82 are equal to each other, the support 23 can appropriately run onto the second projection portion 82 in the downstream side.

According to the above-described multifunction peripheral 1, since the first convex portion 83 and the second convex portion 84 are provided on the side of the support 23, the frictional force that acts between the support 23 and the guide unit 61 is reduced as compared with a case where the support 23 comes in contact with the first projection portion 81 and the second projection portion 82 at a surface that is larger than the front end of the first convex portion 83 and the second convex portion 84, and thus the state where the support 23 is positioned at the position based on the guide unit 61 can be released more smoothly.

According to the above-described multifunction peripheral 1, when the support 23 runs onto the first projection portion 81 and the second projection portion 82, the support 23 comes in contact with the inclination portions 81A and 82A and then runs onto the first projection portion 81 and the second projection portion 82 along the inclination portions 81A and 82A. Accordingly, the support 23 can smoothly run onto the first projection portion 81 and the second projection portion 82 as compared with a case where the inclination portions 81A and 82A are not provided.

According to the above-described multifunction peripheral 1, the reference member 67 can be appropriately read at a position that is not affected by the first projection portion 81 and the second projection portion 82.

Further, According to the above-described multifunction peripheral 1, the tolerance that can be accumulated between the ADF unit 4 and the contact portion 51C becomes the tolerance between the cover member 51 and the hinge portion 55 and the tolerance between the hinge portion 55 and the ADF unit 4. Accordingly, the tolerance accumulated between the ADF unit 4 and the support 23 can be reduced in the case where the support 23 is positioned on the basis of the contact portion 51C that is integrally formed with the cover member 51, rather than in the case where the support 23 is positioned on the basis of the guide unit 61 separated from the cover member 51, and thus the reading precision of the document can be heightened.

According to the above-described multifunction peripheral 1, since the guide unit 61 is made of a resin material, unlike the metal guide unit, the projection portions can be easily provided by a technique of integrally forming the guide unit 61 and the projection portions (e.g., first projection portion 81 and the second projection portion 82).

According to the above-described multifunction peripheral 1, the material that forms the slider portion 23B has higher slidability than the material that forms the carriage unit 23A, and thus the respective performances of the carriage unit 23A and the slider portion 23B can be optimized as compared with a case where the whole support 23 is integrally formed with the same material.

Other Embodiments

Although the embodiment of this disclosure have been described, this disclosure is not limited to the above-described detailed embodiments, and may be embodied in various forms.

For example, in the above-described embodiment, the first projection portion 81 and the second projection portion 82 are exemplified as a specific example of the release unit. However, the number of projection portions are optional, and one projection portion or three or more projection portions may be configured. However, if one projection portion is provided, the inclination is easy to occur on the support when the support runs onto the projection portion, and thus it is preferable that a plurality of projection portions are provided as in the above-described embodiment so that the support runs onto the plurality of projections at the same time.

Further, if it is configured that the contact portion 51C of the cover member 51 and the support 23 are directly positioned, as the above-described embodiment, such a configuration is not limited to the configuration that the projection-shaped contacted portions 87 are provided in the support 23, but may have other shapes.

In the above-described embodiment, it is exemplified that the guide unit 61 is formed of a resin material. However, the configuration of this disclosure can also be adopted even in the case where the metal guide shaft is adopted as the guide unit.

Further, in the above-described embodiment, the image reading device according to this disclosure is configured as the multifunction peripheral. However, this is optional, and the configuration of this disclosure may be adopted in an image reading device, a copy machine, or a facsimile, which has a single function.

What is claimed is:

1. An image reading device comprising:
a document placing portion on which a document is placed;
a conveyor configured to convey a document along a predetermined conveyance path; and
a reading unit configured to read an image of the document, wherein the reading unit comprises:
an image sensor having a plurality of reading elements arranged in a main scanning direction;
a support which supports the image sensor and is movable together with the image sensor in a sub-scanning direction that is orthogonal to the main scanning direction;
a guide which guides the support in the sub-scanning direction by coming in contact with the support when the support is moved in the sub-scanning direction; and
a driving unit configured to move the support in the sub-scanning direction,
wherein in the case of reading the image of the document placed on the document placing portion, the support is moved in the sub-scanning direction within a predetermined reading range, and in the case of reading the image of the document conveyed by the conveyor, the support is to be stopped at a predetermined reading position,
wherein in the case of moving in the sub-scanning direction within the predetermined reading range, the support is moved while keeping in contact with the guide,
wherein the reading unit further comprises:
a release unit configured to release the contact with the guide by separating the support and the guide when the support is moved toward the predetermined reading position; and
a contact portion configured to make contact with the support separated from the guide by the release unit when the support is moved toward the predetermined reading position,
wherein the release unit comprises at least one projection portion formed to project from the guide, and
wherein the support runs onto the at least one projection portion when the support is moved toward the predetermined reading position to separate the support from the guide in an upward direction.

2. The image reading device according to claim 1,
wherein a plurality of projection portions are provided to be formed at positions that are separated from each other in the sub-scanning direction, and
wherein the support is separated from the guide by running onto the plurality of projection portions at the same time when the support is moved toward the predetermined reading position.

3. The image reading device according to claim 2,
wherein the plurality of projection portions are arranged at positions where the plurality of projection portions overlap each other as seen from the sub-scanning direction, and wherein in a moving direction where the support is moved toward the predetermined reading position, a projection height of the projection portions is set low as the projection portions are positioned on an upstream side, while the projection height of the projection portions is set high as the projection portions are positioned on a downstream side.

4. The image reading device according to claim 1, wherein the support has a convex portion that projects toward the projection portion at a position where the support comes in contact with the projection portion when the support is moved toward the predetermined reading position.

5. The image reading device according to claim 1,
wherein in a moving direction where the support is moved toward the predetermined reading position, the projection portion is shaped so that a shape of a portion on an upstream side has an inclination portion that has an upward slope from the upstream side to a downstream side,
and
wherein when the support is moved toward the predetermined reading position, the support comes in contact with the inclination portion and then runs onto the projection portion along the inclination portion.

6. The image reading device according to claim 1,
wherein a reference member, which is read by the image sensor when a reference of the image read by the image sensor is adjusted, is arranged between the predetermined reading range and the predetermined reading position, and
wherein the projection portion is provided more downstream than the reference member in a moving direction where the support is moved toward the predetermined reading position.

7. The image reading device according to claim 1,
wherein a cover that is a separate member from the guide is provided on an upper side of the guide, an upper portion of a main body of the device being configured by the cover, and the conveyor being mounted on the cover through a hinge portion, and
wherein the contact portion is integrally formed with the cover.

8. The image reading device according to claim 1, wherein the guide is a resin component that is made by a resin material.

9. The image reading device according to claim 1, wherein the support comprises a slider portion, which slides along the guide while coming in contact with the guide with a carriage on which the image sensor is attached.

10. The image reading device according to claim 9, wherein the slider portion is formed of a material having higher slidability than the carriage.

11. The image reading device according to claim 1, wherein in the contact portion, tolerance of a relative position with respect to the conveyor is smaller than tolerance of a relative position with respect to the guide.

12. The image reading device according to claim 1, wherein the upward direction is orthogonal to the main scanning direction and the sub-scanning direction.

* * * * *